(12) United States Patent
Mohammed

(10) Patent No.: US 10,880,386 B2
(45) Date of Patent: Dec. 29, 2020

(54) METHOD AND SYSTEM FOR SCHEDULING, INDEXING, CATEGORIZING, AND TRIGGERING DIGITAL CONTENT AND GIFTS FOR FUTURE DELIVERY

(71) Applicant: CircleIt LLC, Chicago, IL (US)

(72) Inventor: Hanan S. Mohammed, Chicago, IL (US)

(73) Assignee: CircleIT LLC, Chicago, IL (US)

( * ) Notice: Subject to any disclaimer, the term of this patent is extended or adjusted under 35 U.S.C. 154(b) by 0 days.

(21) Appl. No.: 16/228,080

(22) Filed: Dec. 20, 2018

(65) Prior Publication Data

US 2019/0199813 A1 Jun. 27, 2019

Related U.S. Application Data

(60) Provisional application No. 62/609,405, filed on Dec. 22, 2017.

(51) Int. Cl.
 *H04L 29/08* (2006.01)
 *H04L 12/58* (2006.01)
 (Continued)

(52) U.S. Cl.
 CPC ........ *H04L 67/26* (2013.01); *G06Q 10/0631* (2013.01); *G06Q 10/0639* (2013.01); *G06Q 10/0832* (2013.01); *G06Q 10/1097* (2013.01); *H04L 51/12* (2013.01); *H04L 67/02* (2013.01); *G06F 3/0486* (2013.01)

(58) Field of Classification Search
 None
 See application file for complete search history.

(56) References Cited

U.S. PATENT DOCUMENTS

| 8,307,029 B2 | 11/2012 | Davis et al. |
| 2011/0060994 A1 | 3/2011 | Maxwell et al. |

(Continued)

FOREIGN PATENT DOCUMENTS

WO  WO 2013184793  * 12/2013  ......... G06Q 30/0281

OTHER PUBLICATIONS

International Search Report and Written Opinion, dated Mar. 5, 2019, for PCT Application No. PCT/US2018/067014, filed Dec. 21, 2018.

(Continued)

*Primary Examiner* — Scott B Christensen
(74) *Attorney, Agent, or Firm* — Barnes & Thornburg LLP; Sarah Myhrom Eisenman

(57) ABSTRACT

The present method and system is directed generally to a process and system, preferably embodied in an app executable on a personal computing device, wherein a user may generate content and schedule the generated content for future delivery to a designated recipient, living or not living at the time of the scheduling of the delivery. The delivery may be set to occur a known future date, on a future milestone wherein the start date is known or not known, or on the occurrence of a future event of unknown date to the user at the time of delivery scheduling and that may, or may not, occur. The invention relates to an app and web-based system and method that allows users to send digital content and add physical gifts a specified user at a specified time and/or the occurrence of a specified event in the future.

10 Claims, 5 Drawing Sheets

(51) Int. Cl.
  *G06Q 10/06* (2012.01)
  *G06Q 10/08* (2012.01)
  *G06Q 10/10* (2012.01)
  *G06F 3/0486* (2013.01)

(56) References Cited

U.S. PATENT DOCUMENTS

| | | |
|---|---|---|
| 2012/0066613 A1 | 3/2012 | Berger |
| 2013/0254314 A1 | 9/2013 | Chow |
| 2013/0268432 A1* | 10/2013 | Kressler .................. G07F 17/40 705/39 |
| 2014/0136619 A1* | 5/2014 | Hoberman .............. H04L 67/18 709/204 |
| 2014/0229321 A1* | 8/2014 | Ranganath ......... G06Q 30/0619 705/26.7 |
| 2018/0176160 A1* | 6/2018 | Steller ................... H04L 67/306 |
| 2019/0180358 A1* | 6/2019 | Nandan .................. G06Q 40/02 |

OTHER PUBLICATIONS

Notification concerning Transmittal of International Preliminary Report on Patentability and International Preliminary Report on Patentability dated Jun. 23, 2020 and issued in PCT Application No. PCT/US2018/067014.

* cited by examiner

METHOD AND SYSTEM FOR SCHEDULING, INDEXING, CATEGORIZING, AND TRIGGERING DIGITAL CONTENT AND GIFTS FOR FUTURE DELIVERY

CROSS-REFERENCE TO RELATED APPLICATIONS

This application claims the benefit of U.S. Provisional Application Ser. No. 62/609,405, filed Dec. 22, 2018 and entitled WEB-BASED PROCESS FOR SCHEDULING, CATEGORIZING, INDEXING AND TRIGGERING DIGITAL CONTENT AND GIFTS FOR FUTURE DELIVERY, the entirety is which is incorporated herein by reference.

FIELD OF THE INVENTION

The invention relates generally to an artificial intelligence learning and driven application method and system that targets specific content, including but not limited to messaging, user-developed or selected content, gifts, notifications and/or reminders for delivery on the occurrence of a specified future event to a specified user, or to a user within the subscriber's nominated family and/or friend circle.

BACKGROUND

The current state of social media applications ("apps") provide real-time messaging only to or between participants or subscribers. It would be highly advantageous to provide an alternative method, system or app that is configured to deliver user-selected content developed to a targeted user at a specified point in the future, e.g., at a predetermined future date, or the occurrence of a predetermined future event that may, or may not, occur. The present invention overcomes these deficiencies and provides, inter alia, the above-referenced improvements.

BRIEF SUMMARY OF THE INVENTION

The present method and system is directed generally to a process and system, preferably embodied in an app executable on a personal computing device, wherein a user may generate content and schedule the generated content for future delivery to a designated recipient, living or who will be born in the future. The delivery may be set to occur a known future date, on a future milestone or event wherein the milestone start date or event occurrence date is known or not known, or on the occurrence of a future event of unknown date to the user at the time of delivery scheduling and that may, or may not, occur. More specifically, the invention relates to an app and web-based system and method that allows users to send digital content and add physical gifts such as flowers, gift cards and the like to a specified user at a specified time and/or the occurrence of a specified event in the future.

DETAILED DESCRIPTION

Figure 1:
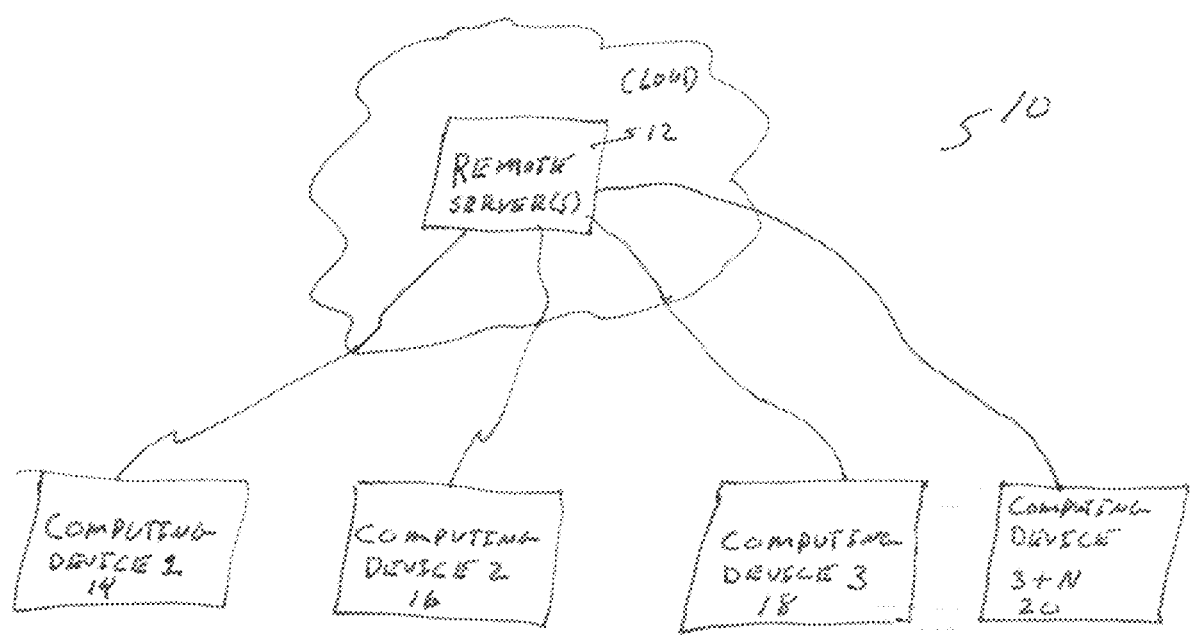
FIG. 1 is a schematic drawing of one embodiment of the present invention.

While the invention is amenable to various modifications and alternative forms, specifics thereof are shown by way of example in the drawings and described in detail herein. It should be understood, however, that the intention is not to limit the invention to the particular embodiments described. On the contrary, the intention is to cover all modifications, equivalents, and alternatives falling within the spirit and scope of the invention.

Various embodiments of the present invention comprise a platform 10 comprising a cloud-based or otherwise remotely located server(s) 12 adapted to store information and execute algorithms in accordance with the various methods described herein. The cloud-based server(s) 12 may, as shown in FIG. 1, be in operative connection with a plurality of computing devices 1 (14), 2 (16), 3 (18), 3+N (20). Computing devices as used herein may comprise personal computers, desktop computers, smartphones, tablets and the like, all of which comprise as the skilled artisan will recognize, a display, a data input such as a keyboard or the like, a memory in communication with the data input and adapted to store information including, but not limited to, executable program instructions, and a processor in communication with the memory, the display and the data input, the processor adapted to, inter alia, execute programmable instructions. Each computing device is adapted to connect to the remotely located server(s) by connecting with the worldwide web or internet and/or a cellular connection. Further, each computing device may be adapted to connect with each other via the internet or cellular connection as is well understood in the art.

The system and methods described herein generally use the platform 10 described in connection with FIG. 1. The platform of FIG. 1 is well-known to the skilled artisan and will not therefore be described further.

Figure 2:
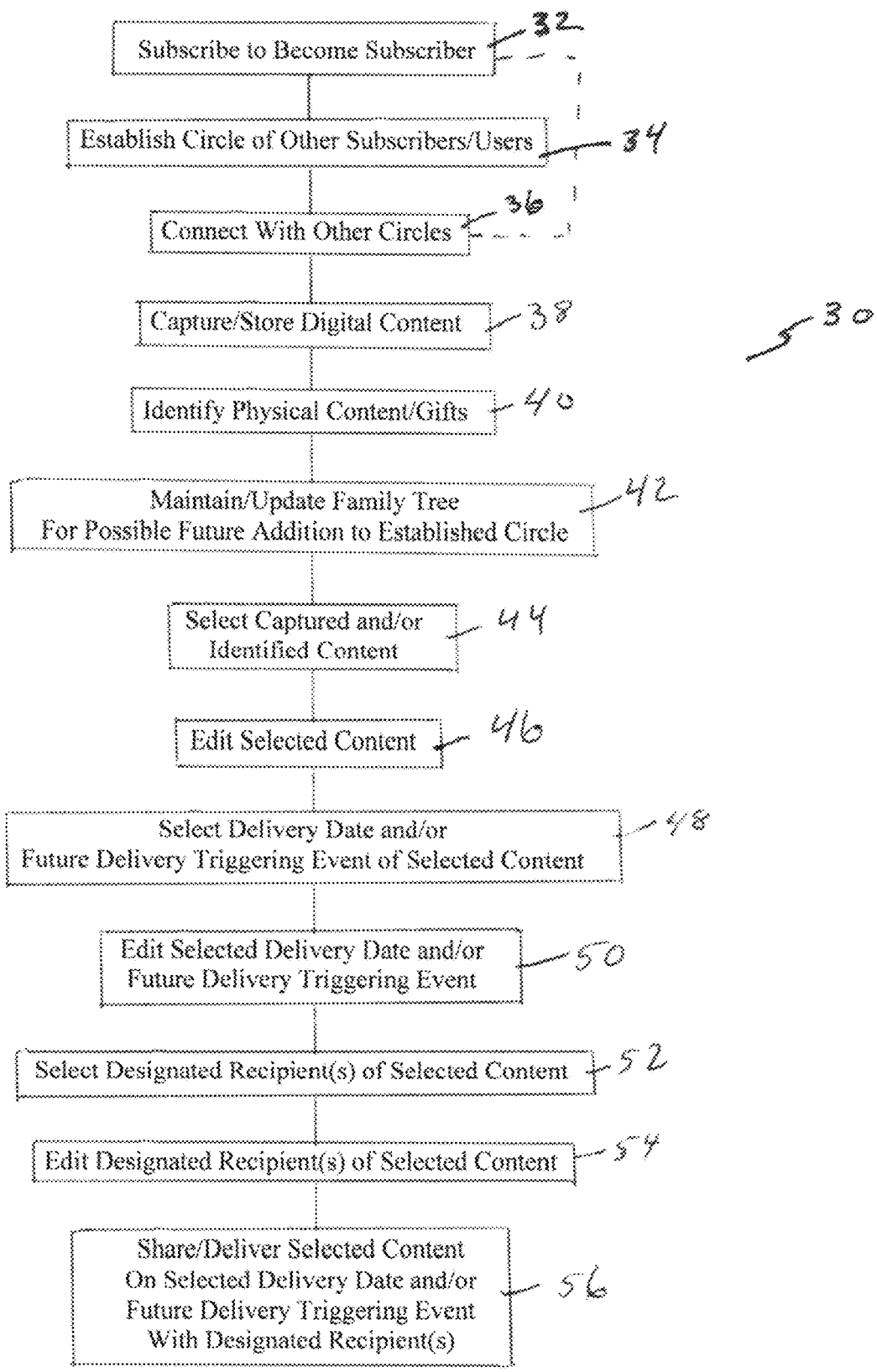
FIG. 2 is a flow diagram of one embodiment of the present invention.

Turning now to FIG. 2, a general process flow 30 is provided for one embodiment of the present invention. Thus, the process begins at 32 when a user subscribes to the method or system and establishes a trusted circle of friends and/or family, each of whom are also subscribers or users of the method of system, or may become subscribers or users of the method or system in the future. Those outside the established circle are not allowed by default to see any content viewable by those in the established circle.

As noted, a subscriber may establish his or her own circle at any time 34 or may, as indicated by the dashed line, may connect with other established circles to create a network of associated circles 36. Still further, the subscriber may establish his or her own circle after subscribing and then connect with other circles to create a network of associated circles 34, 36.

At any point in this process, the subscriber may begin to capture and/or store digital content 38. The digital content captured and/or stored using the application and related interface discussed herein is catalogued in the subscriber's digital library located in the cloud-based server(s) and may be accessed, viewed, curated, etc., through the application interface at any time. This digital content may be designated or selected for delivery to a designated recipient within the circle, to all users within the established circle, or to part or all of a network of associated circles, or any combination thereof.

In addition to digital content, at step 40, the subscriber may identify physical content such as flowers or other gifts or items for delivery to a designated recipient within the circle, the circle itself or part, or all, of the network of associated circles, or any combination thereof.

A subscriber's family tree may be developed and maintained as it grows or changes through births, marriages, deaths, etc. at 42. In this context, a generational key is provided to future users, e.g., unborn users and/or users who are added by marriage or the like in the future, so they can unlock the related journeys. Functionality in matching family trees with subscribers' next of kin allows safe keeping and release to an intended future user so that the future user may see the journeys and related content stored therein. In certain embodiments, the users may have a digital identifier that will be used to link family members and/or friends, e.g., father, mother, son, daughter, best friend, etc.

Next, once the content is captured and/or stored or identified, the captured and stored digital content and/or identified physical content may be viewed and/or curated at the computing device display as it is stored and organized within the subscriber's digital library. The subscriber may also then select one or more digital content pieces for future delivery designation 44. Moreover, the subscriber may also use the application's interface to identify and select one or more physical content items for future delivery designation. As noted in FIG. 2, the selected content, whether digital or physical, may be modified or edited by the subscriber or by his or her designee or proxy up to the point of the future delivery 46.

As defined herein, "selected content" means digital content, for example and without limitation, video, picture, audio, SMS or other text messaging, social media messaging, email, and "selected content" further includes physical content such as flowers, candy, cards and the like.

The subscriber then selects the delivery date and/or a future delivery triggering event for the selected content 48. As with the selected content, the delivery date and/or future delivery triggering event may be modified or edited by the subscriber or by his or her designee or proxy up to the point of the future delivery. The delivery date may be a single date in time that may be in the future, may be a series of dates and/or may be a recurring date. Similarly, the future delivery triggering event may be a single future event, a series of future events and/or a recurrent future event. The selected delivery date and/or future delivery triggering event may be modified or edited by the subscriber or by his or her designee or proxy up to the point of the future delivery 50.

Next, the subscriber selects a designated recipient of the selected content at 52. As defined herein, "designated recipient" refers to one or more of the following:

(1) A specific person within an established circle who is either living or who has not yet been born but is identified by relationship with the subscriber, e.g., a child, a grandchild, a great grandchild, and the like. If the designated recipient is not born at the time of designation by the subscriber as described herein, then once the designated recipient is born and meets the criterion, e.g., child, grandchild, etc., then the designated recipient either subscribes and enters the established circle when he or she is of an age that allows taking such action, or an adult or other person assists that person to subscribe and enter or join the established circle. Once this is accomplished, the selected content will be scheduled for delivery to the designated recipient as provided by the subscriber.

(2) One or more specific people within the established circle.

(3) One or more specific people within circle(s) that are associated with the established circle, i.e., a network of associated circles.

(4) All people within one or more of the established circle and/or a network of associated circles.

(5) Any combination of the above.

The designated recipient may be modified or edited by the subscriber or by his or her designee or proxy up to the point of the future delivery 54.

Selection of the delivery date and/or a future delivery triggering event for the selected content to the designated recipient gives rise to a number of options for sharing the content with the designated recipient:

(1) The selected content may be shared right away with the designated recipient.

For example, the following events may be the event triggering content delivery: news of a pregnancy, news of a birth, a graduation, a wedding, a wedding anniversary, a funeral, and the like.

(2) The selected content may be scheduled for delivery or sharing with the designated recipient at a future milestone event that may, or may not, occur.

For example, a future birth and/or birthday(s) of a living child, grandchild, great grandchild, niece, nephew may be a future milestone event. Further, a future birth and/or birthday(s) of a presently unborn child, grandchild, great grandchild, niece, nephew, etc. may be a future milestone event.

(3) the selected content may be scheduled for delivery or sharing with the designated recipient at a specific future date(s).

For example, the future milestone event(s) may coincide with holidays or other special days or occasions of note such as birthdays, mother's day, father's day, Christmas, valentine's day and the like.

Each of these delivery dates and/or future milestone events may be scheduled for a single content delivery on a single date or future event, or may be a recurring delivery up to a certain timepoint or event. For example, a grandfather may store a series of video messages, or other digital and/or physical content, to grandchildren, whether born or unborn, that begin with delivery at age 2 and continue at each birthday up to age 21.

Ultimately, when the delivery time arrives and/or if the future delivery triggering event occurs, the selected content is delivered to the designated recipient 56.

In this way, the right content (selected content) is shared with the right person (designated recipient) at the right time (delivery time and/or occurrence of a future delivery triggering event).

Figure 3:
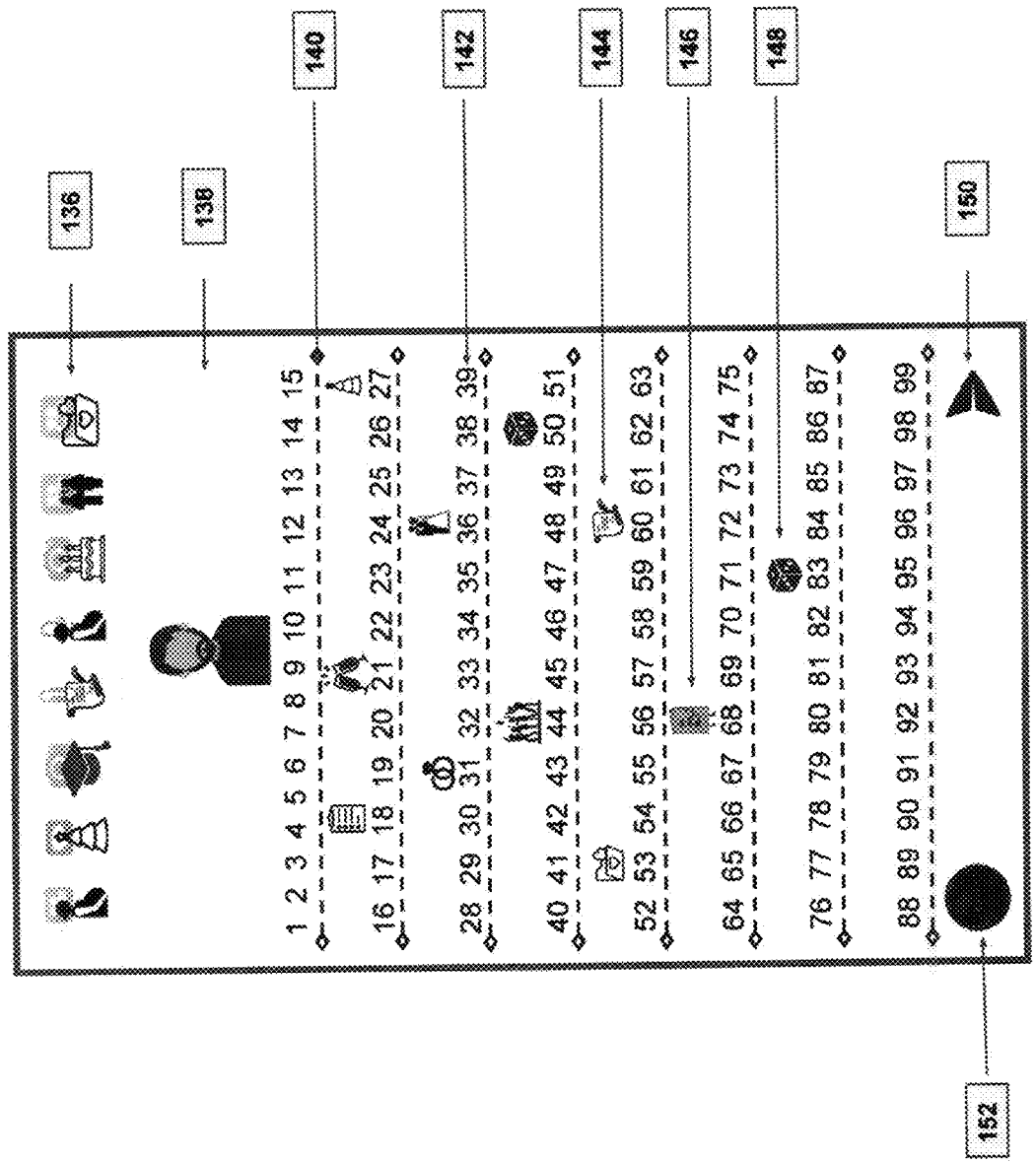
FIG. 3 is an exemplary display screen of one embodiment of the present invention.

Turning now to FIG. 3, an embodiment of a "smart journey visualizer" 100 is illustrated. This smart journey visualizer 100 is a tool that may be displayed on a computing device's screen as part of the related app and assists in determining when certain future delivery triggering events are determined using various sources of input such as social media, the internet, user inputted data and the like, these future events are referred to above as future delivery triggering events. In some embodiments, the input information may be analyzed by, enhanced by and/or subjected to an artificial intelligence ("AI") analysis algorithm(s) and/or machine learning algorithm(s) to assist in refining the precision of prediction of any future delivery triggering event, e.g., a future pregnancy that ultimately results in the future birth of a child, grandchild, great grandchild etc.

Specifically the smart journey visualizer 100 provides the subscriber with an easy to use, drag and drop mechanism for selected content into personalized life journeys as they progress along the designated recipient's 138 life line, shown numerically progressing from 1 (earliest time point) to 99 (latest time point) along the designated recipient's life line 138. The subscriber may begin by establishing a journey library 136 which contains digital content added and curated by the subscriber as discussed above in connection with FIG. 2. The subscriber also selects the designated recipient 138 that is the subject of the personalized life journey and smart journey visualizer 100 and can start a smart journey by dragging and dropping selected content into the life line 142. Moreover, the subscriber can see, i.e., click into, edit, or place a delivery hold on, any digital content selected previously for the selected journey already in progress related to the designated recipient at 144 along the lifeline. These in-progress journeys may comprise things like progressing through a course of studies, an ongoing pregnancy and the like. Thus, the smart journey visualizer 100 provides a mechanism for selecting delivery dates, delivery triggering events, the related selected content for delivery on the selected dates and/or events, and the designated recipient who will receive the selected content at the selected timepoint. Moreover, a collaborator may be added by the subscriber to the recipient's smart journey(s) at 152, the collaborator may have the same functional abilities regarding the smart journey(s) of designated recipient as the subscriber does.

Figure 4:
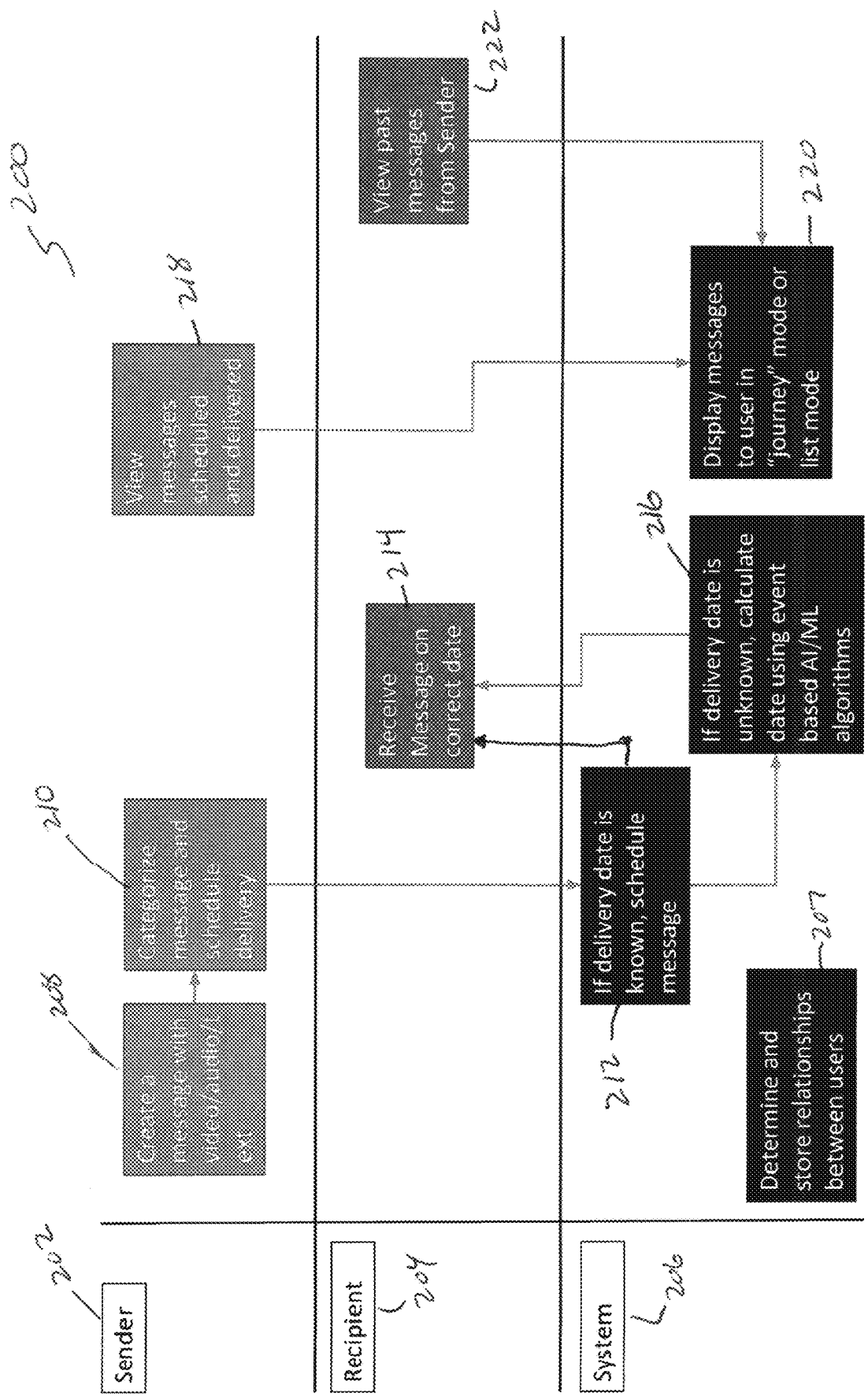
FIG. 4 is a block process flow diagram of one embodiment of the present invention.
Figure 5:
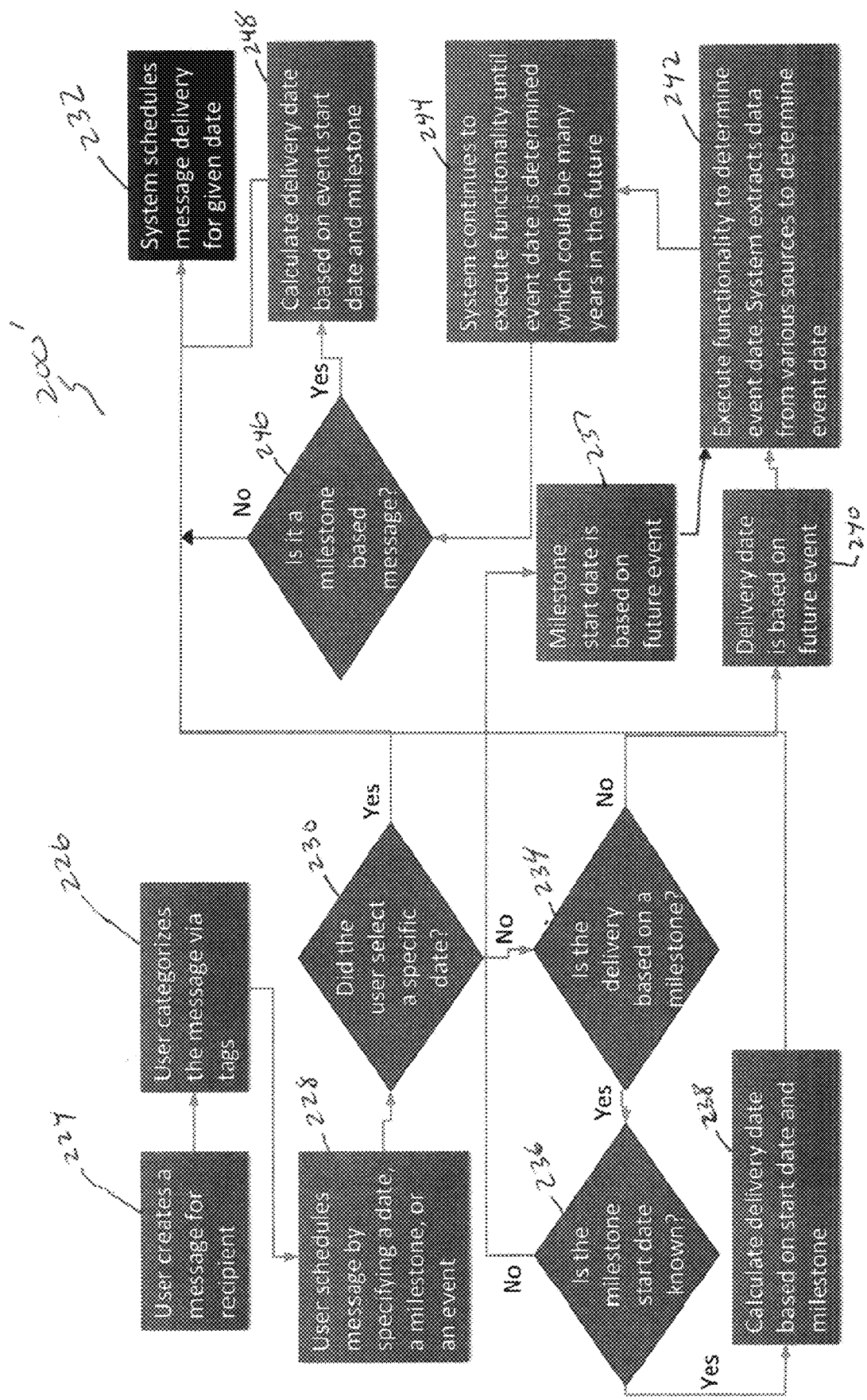
FIG. 5 is a block process flow diagram of one embodiment of the present invention.

FIGS. 4 and 5 provide flow diagrams of the smart journey process 200 to aid in further understanding. Thus, FIG. 4 divides the process flow into three categories: Sender (subscriber and/or collaborator) 202, Designated Recipient 204 and System 206. The system 206 is adapted to determine and store relationships between users 207. The sender 202 creates digital content as discussed above regarding FIG. 2 at 208, that may comprise video, audio, messaging, emailing and the like. The created content then is selected, categorized by, inter alia, delivery date and/or future delivery triggering event, and scheduled for delivery at 210 to the designated recipient 204. At that point, if the delivery date is known the system 206 schedules delivery of the created content 212 and the selected content is delivered to the designated recipient 204 at 214.

If the delivery date is unknown, i.e., the selected content is scheduled for delivery upon the occurrence of a future delivery triggering event, then either the social media scouring algorithms identify the occurrence of the event and/or event-based AI and/or machine learning algorithms are employed to predict the occurrence of the event 216. When the subject event is determined to have occurred, then the selected content is delivered 214 to the designated recipient 204.

The sender 202 may also view scheduled content messages as they are scheduled and/or delivered 218 and, as discussed above, may edit delivery timepoint, selected content and/or designated recipient up to the point of scheduled delivery 214. Further, the system 206 may display the scheduled and/or delivered selected content to the subscriber in a journey visualizer mode as in FIG. 3 or simply in a list mode, e.g., chronological or other ordering 220.

Finally, the designated recipient 204 may access system 206 to view one or all previously delivered content that were sent by the subscriber/sender 202 to the designated recipient 204.

Turning now to FIG. 5, a smart journey process 200' is described from a system-based process flow perspective. Thus, the process 200' begins with the subscriber user creating a content-based message for the designated recipient at 224, the subscriber user then categorizes the message using, e.g., tags at 226 and schedules the content-based message for delivery to the designated recipient by specifying at date, a milestone and/or an event triggering delivery at 228.

If the subscriber user selected a specific delivery date 230, then the system schedules the content-based message for delivery to the designated user 232.

If the subscriber user did not select a specific delivery date at 230, then if the delivery is based on a milestone 234, and if the milestone start date is known 236, then the delivery date for the selected content-based message is calculated based on the milestone start date 238 and the system schedules the delivery of the content-based message to the designated recipient accordingly at 232. If the milestone start date is not known 236, then the system determines the milestone start date is based on a future event 237, and functionality is executed to determine the event date, extracting same from various social media and other sources using known scouring techniques and algorithms to assist in determining the date of the future event at 242.

If, on the other hand, the subscriber user did not select a specific delivery date at 230, and if the delivery is not based on a milestone 234, then the system determines that the delivery date is based on a future event 240, and functionality is executed to determine the event date, extracting same from various social media and other sources using known scouring techniques and algorithms to assist in determining the date of the future event at 242.

In the case where the system at 242 is determining a future event date, the system continues to execute the related functionality is executed to determine the event date, extracting same from various social media and other sources using known scouring techniques and algorithms to assist in determining the date of the future event at 244 to refine the predicted event date and to provide as precise a prediction as possible up until the actual occurrence of the event. The system then schedules the content-based message for delivery to the designated recipient at 232, but may update or change that delivery date based on updated information obtained in ongoing step 244. If the future event is a milestone and the selected content-based message is to be delivered at the start of the milestone, then the delivery date is scheduled based on the start date of the milestone at 248.

Again, the skilled artisan will now recognize that it is possible to schedule selected content for delivery to a designated recipient at a point in time in the future and/or based on a future delivery triggering event that may, or may not, occur.

The system and method of the present invention is preferably operated as an application or "app" as is commonly known to the skilled artisan. The app is manifested on a subscriber's or user's computing device display as illustrated in exemplary form in FIGS. 6A-8C. The executable instructions for the app of the present method and system may be located in total or in part in the memory of the subscriber's computing device, e.g., a smartphone and/or may be located in whole or in part on the remote cloud-based server as shown in FIG. 1. The various icons shown on the exemplary displays are understood to be active and, when actuated, initiate related programmable instructions. Accordingly, the various display screens of the associated app allow the subscriber to communicate in effectively real time and/or with scheduled future content deliveries with icon buttons actuating actions such as take a photo, record video, message (text or otherwise), record an audio file, create pdf attachments and send them in effectively real time, i.e., without delay to a future date or event. An address book lookup is used for identifying designated recipient information in combination with a "send now" icon button to deliver selected content in effectively real time.

In addition, the app display may comprise actuable icons or buttons relating to creating and/or uploading digital content and/or attach physical gifts for personalized "journeys" for designated recipients and/or followers. Thus, the subscriber or user may, using the app, search for contacts, active journeys, groups, etc., and may provide the designated recipient date(s) of birth and relationship. Journey triggers, referred to above as future delivery triggering events, are also provided that subscribers may select for artificial intelligence ("AI") assisted-delivery for triggers or moments that are yet to occur in the future, e.g., the birth of a grandchild or the like.

The skilled artisan will readily understand that each functional element discussed herein and the various embodiments of the method and system of the present invention may all be implemented via an app that is executable by a computing device.

Exemplary Uses of the Present Invention

1. Individuals, Families, Friends

The various embodiments of the invention as embodied in an app as described above, may be used to develop smart journey life timelines and targeted, selected content (digital and/or physical) to be delivered to the designed recipient, e.g., to a spouse, children, grandchildren, great grandchildren, parents and/or extended family.

Similarly, the selected content may be scheduled for delivery to friends or other users in a specific established circle or a network of associated circles.

2. Business Use

Corporate strategy groups may develop smart journey timelines to catalog current corporate strategy and provide guidance and contest for strategic decision-making. Selected content may be scheduled for delivery to designated recipients as a result of corporate events.

Research groups can develop smart journey timelines to catalog inventions, development and achievements for specific research and product development as well as catalog context, challenges and possible considerations to be delivered to research group(s) in the future.

One possible working example of the present invention may comprise the following:

A method for scheduling automated delivery of digital content to a designated recipient at a designated future point in time, comprising:

providing a system comprising:

a cloud-based server having a memory and programmed instructions stored therein, a plurality of computing devices in operative connection and communication with the cloud-based server, each computing device in the plurality comprising a display, a processor and a memory, wherein the computing device is configured to access the memory and programmed instructions stored in the cloud-based server and execute at least some of the programmed instructions;

providing a user and enabling the user to subscribe to the system to become a subscriber, wherein the system comprising other subscribers and wherein the subscribers can execute the programmed instructions using a computing device in the plurality of computing devices;

wherein the subscriber accesses the programmed instructions with a computing device and actuates the accessed programmed instructions to:

establish a circle of some of the other subscribers to the system;

create and store digital content at a data library located in the memory of the cloud-based server of the system;

access, curate and/or edit with the created and stored digital content;

select a designated recipient for receiving digital content selected by the subscriber from the created and stored digital content;

select a future delivery triggering event wherein the event is either based on a milestone with a known start date or on a future event with an unknown date of occurrence;

schedule a delivery date for delivery of the selected digital content to the designated recipient; and deliver the selected digital content to the designated recipient on the scheduled delivery date.

The present invention should not be considered limited to the particular examples described above, but rather should be understood to cover all aspects of the invention. Various modifications, equivalent processes, as well as numerous structures to which the present invention may be applicable will be readily apparent to those of skill in the art to which the present invention is directed upon review of the present specification.

What is claimed is:

1. A method for scheduling automated delivery of digital content to a designated recipient at a designated future point in time, comprising:

providing a system comprising: a cloud-based server having a memory and programmed instructions stored therein, a plurality of computing devices in operative connection and communication with the cloud-based server, each computing device in the plurality comprising a display, a processor and a memory, wherein the computing device is configured to access the memory and programmed instructions stored in the cloud-based server and execute at least some of the programmed instructions; enabling a user to subscribe to the system to become a subscriber, wherein the system comprises other subscribers and wherein the subscribers can execute the programmed instructions using a computing device in the plurality of computing devices;

wherein the subscriber accesses the programmed instructions with a computing device and actuates the accessed programmed instructions to perform:

establishing a circle of some of the other subscribers to the system, wherein the circle is enabled to include both current subscribers and future subscribers who are not yet born but are identified by relationship with the subscriber;

creating and storing digital content at a data library located in the memory of the cloud-based server of the system;

accessing, curating and/or editing the created and stored digital content;

selecting a designated recipient for receiving digital content selected by the subscriber from the created and stored digital content, wherein the designated recipient is selected from the circle and is enabled to be selected from both the current subscribers and future subscribers;

scheduling a delivery date for presenting the stored digital content to the designated recipient, the scheduling comprising:

determining if the subscriber has provided a specific date for the delivery date;

responsive to the subscriber not providing a specific delivery date, automatically scheduling the delivery date by:

selecting, by the subscriber, a future delivery triggering event having a date of occurrence that is unknown to the subscriber at the time that the future delivery triggering event is selected by the subscriber and that is not predictable solely based on another date;

executing a first scraping of available media;

scheduling the delivery date based on a first predicated date of occurrence of the future delivery triggering event based on the first scraping;

executing a subsequent scraping of updated available media after scheduling the first delivery date to refine the first predicted date of occurrence and replace the first delivery date with a different second predicted date of occurrence;

scheduling a delivery date for delivery of the selected digital content to the designated recipient based on the second predicted date of occurrence of the future delivery triggering event; and delivering the selected digital content to the designated recipient on the scheduled delivery date.

2. The method of claim 1, further comprising using artificial intelligence and/or machine learning algorithms to analyze data obtained from the scraping steps.

3. The method of claim 1, further comprising the subscriber, before the scheduled delivery date, editing one or more of the group consisting of: the selected digital content, the designated recipient, and the selected future delivery event.

4. The method of claim 1, further comprising the subscriber connecting the established circle with at least one other circle established by other subscribers.

5. The method of claim 1, further comprising selecting physical content for scheduled future delivery to the designated recipient.

6. The method of claim 1, further comprising designating the designated recipient as a person that has not yet been conceived or born.

7. The method of claim 1, further comprising designating the designated recipient as all the subscribers in the established circle.

8. The method of claim 1, further comprising designating the designated recipient as more than one person.

9. The method of claim 1, wherein the future delivery triggering event comprises a future event that may not occur.

10. The method of claim 1, wherein the subscriber selects a plurality of future delivery triggering events and wherein the selected digital content is different for each one of the plurality of future delivery triggering events.

* * * * *